April 13, 1965 D. T. WALTERS ETAL 3,177,917
TRACTION TREAD PORTION FOR TIRE CASING
Filed Oct. 28, 1963 3 Sheets-Sheet 1

INVENTOR.
DONALD T. WALTERS
BY CHARLES O. MOORE
ATTORNEY

April 13, 1965  D. T. WALTERS ETAL  3,177,917
TRACTION TREAD PORTION FOR TIRE CASING
Filed Oct. 28, 1963  3 Sheets-Sheet 2

INVENTOR.
DONALD T. WALTERS
CHARLES O. MOORE
BY
ATTORNEY

April 13, 1965 D. T. WALTERS ETAL 3,177,917
TRACTION TREAD PORTION FOR TIRE CASING
Filed Oct. 28, 1963 3 Sheets-Sheet 3

INVENTOR.
DONALD T WALTERS
CHARLES O. MOORE
BY Raymond Fink
ATTORNEY

United States Patent Office 3,177,917
Patented Apr. 13, 1965

3,177,917
TRACTION TREAD PORTION FOR TIRE CASING
Donald T. Walters, Conifer, and Charles O. Moore, Lakewood, Colo., assignors to The Gates Rubber Company, Denver, Colo., a corporation of Colorado
Filed Oct. 28, 1963, Ser. No. 319,119
9 Claims. (Cl. 152—209)

This invention relates to pneumatic tires and more particularly to improved design of tread patterns to increase overall traction and yet maintain desired stability.

In the design and construction of tire treads, it has been recognized for some time that generally circumferential elements accomplish desired characteristics of wear, stability and quiet running features. Also it has been recognized that transverse elements are generally utilized in order to obtain increased degree of traction. Transverse elements, however, inherently impart rather poor stability characteristics and tend to generate a high noise level during running. In order to minimize undesirable characteristics of the transverse elements, tire design conventionally utilizes a compromise of diagonal elements in order to achieve the desired multi-physical characteristics of both the circumferential and transverse designs.

According to the present invention, a method has been devised for designing tire tread patterns which incorporate both circumferential and transverse elements in such a manner as to retain the desired functional characteristics of both the elements and yet at the same time minimize the undesirable characteristics of the transverse designs.

Accordingly, it is an object of the present invention to provide a method of designing tire tread whereby both circumferential and transverse elements are incorporated so as to obtain a maximum degree of traction.

It is another object to provide for improved desired tire tread traction, but yet to minimize the generation of noise and retain a high degree of stability.

It is a further object to provide a tire tread design which creates a traction column having a high degree of shear resistance.

It is still a further object to provide for a tread design which compacts a traction column so as to increase the pulling ability of the tire against the traction medium.

The above and other objects of the present invention may be accomplished by designing a basically circumferential design, subsequently superimposing a basically transverse design thereupon and finally laterally shifting the formed grid pattern to provide offset ribs and voids to create the tread design.

In order to increase the degree of traction of the tread elements against the traction medium, the voids are then tapered in such a manner as to have a relatively wide included angle compared to current tire design practice. Thus, the offset ribs which are formed in accordance with the invention are separated by voids which are exceptionally wide at the tread surfaces. Therefore, on soft road surfaces the side of the voids become load-bearing surfaces. The zigzag sides of the tapered voids grip into the traction material such as mud, snow or sand which has been compacted by the design of the void into the groove area thus providing additional traction.

These objects and advantages will become more apparent in the following detailed description when considered in connection with the accompanying drawings illustrating preferred embodiment of the present invention, in which:

FIGURE 1A, 1B and 1C indicate the utilization of essentially circumferential and transverse designs to form conventional traction tires;

FIGURE 2 indicates the superimposition of circumferential and transverse elements to form the slipped plane concept as embodied by the present invention;

FIGURE 3 indicates a variety of slipped plane designs which can be formed by utilization of the concepts as indicated by the embodiments of this invention;

Figure 1A:
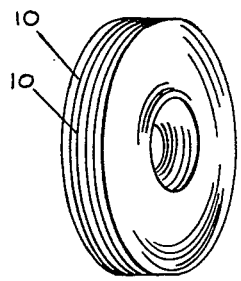
Figure 1B:
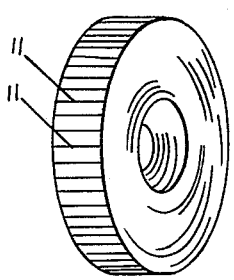
Figure 1C:
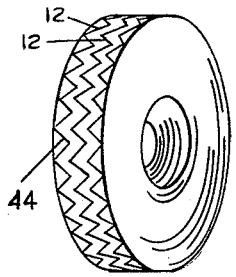
Figure 2:
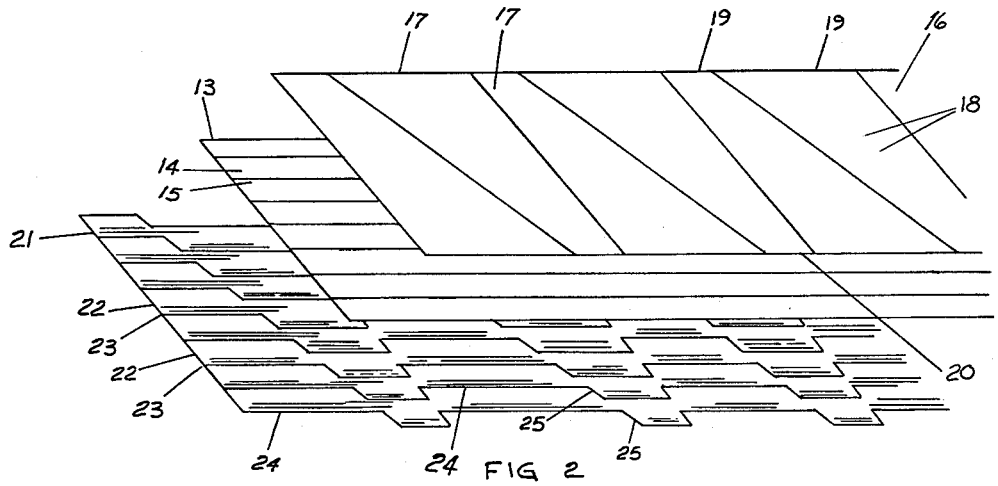

A very brief explanation can be understood by referring to the diagrammatic representation which can be found in FIGURES 1 and 2. FIGURE 1A shows a representation of a tire in which the elements 10 are basically disposed in a circumferential manner. For purpose of this explanation this configuration would represent straight ribs and voids extending circumferentially around the tire. Such a tire, however, would lack completely in traction features. It is by means of transverse designs or elements combined with the circumferential design that traction will be obtained. In FIGURE 1B the elements 11 represent the transverse features which would be incorporated in a tire tread design. Thus, when the circumferential elements 10 of FIGURE 1A are combined with the transverse elements 11 of 1B, one obtains the common and characteristic zigzag elements 12 of 1C. In effect, a compromise has been made in order to obtain the inherent and desired characteristics of wear, stability and quietness of the circumferential elements and a degree of traction as obtained from the transverse elements. The resultant is a real compromise since a complete degree of traction cannot be obtained because of the sacrifice of true transverse characteristics. In addition to the loss of traction one also obtains some degree of loss of stability and increase of noise generation. In addition, since the circumferential elements have taken on a degree of transverse characteristics, the loss of stability is accentuated and wear characteristics have been impaired.

The basic concept of the embodiment of the present invention can be explained and can be understood by referring to the diagrammatic explanation which is indicated in the series of FIGURE 2. Plane 13 represents the series of ribs 14 and voids 15 which would extend circumferentially around the tire as explained above. As was indicated, such a design would lack completely in traction features. If, however, plane 16 of transverse elements 17 is superimposed upon the plane 13 of circumferential designs, a grid 18 will be formed consisting of the features of the circumferential elements and the transverse elements.

Reference to FIGURE 2 indicates that the transverse elements 17 are formed of alternate transverse wedge sections. Thus, adjacent wedges are convergent toward opposite circumferences 19 and 20 of the tire. Such an alternate transverse pattern is combined to extend completely around the circumference of the tire to form the rib pattern 18 on the tire tread.

If one then further envisions that the transverse elements are first laterally shifted relative to the adjacent transverse element before the transverse and circumferential elements are superimposed upon one another, a resultant design 21 will be formed. The design 21 in reality consists of a series of ribs 22 and voids 23 which contain portions of circumferential characteristics 24 and transverse characteristics 25. Thus, the resultant design 21 effectively combines the full effects of characteristics obtained by both circumferential and transverse designs.

The basic tread design therefore consists of a series of circumferential running ribs with individual offset blocks making up the ribs. Generally, it is helpful to impose a degree of zigzag to the sides to provide additional traction edges. The design basically consists of a series of circumferential ribs running around the tire tread. The design is further broken up into blocks by forming transverse adjacently displaced alternate element sections and superimposing those sections upon the circumferential design. The transverse elements are laterally shifted relative to the adjacent element. The mechanics of shifting or slipping the plane design has suggested the name "Slipped Plane" design to refer to the concept employed by the invention.

Figure 3:
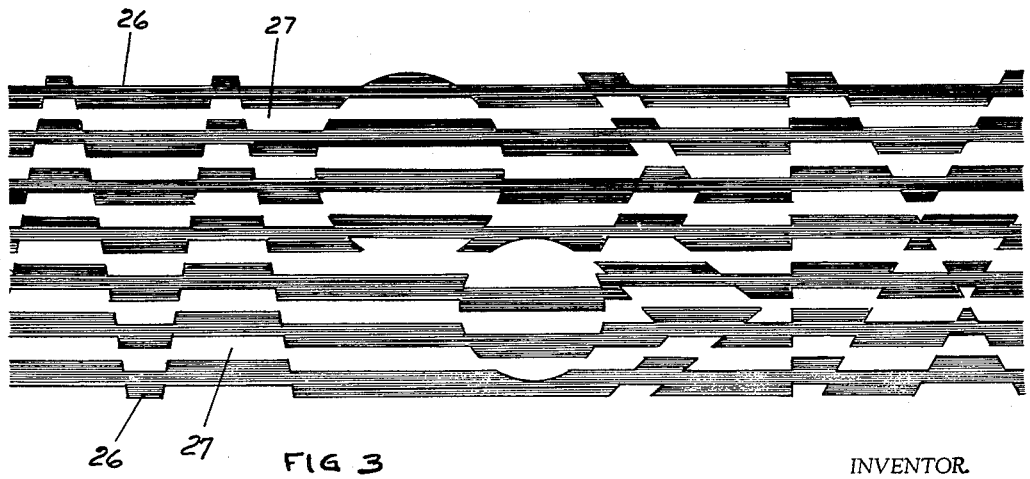

The basic slipped plane concept can acquire a large number of variations in reality limited only by the imagination of the designer. FIGURE 3 diagrammatically indicates the incorporation of a large number of designs which have been utilized but yet which employ the same basic concept. It can be seen by reference to FIGURE 3 that various transverse configurations can be employed with a lateral shifting of the transverse design with superimposition on the basic circumferential design. In order to increase the traction, the tire tread is formed by removing alternate circumferential rib elements leaving the alternating ribs 26 and grooves 27. The basic result is a continuous circumferential rib 26 having incorporated therewith definite transverse elements at regular intervals. In order to incorporate the slipped plane concept into the design of tire treads one may separate the tread into a number of circumferentially running ribs. The circumferential design is then broken up into blocks with lines drawn transversely across the tread. To add some degree of stability to the transverse portions of the elements alternate lines are generally drawn to have an included angle between them. A degree of regularity or symmetry is created by having the adjacent transverse elements convergent in opposite directions. The wedge portions as indicated by plane 21 in FIGURE 2 are therefore formed by laterally shifting the adjacent wedges to form offset ribs and voids which make up the tread design.

Figure 5:
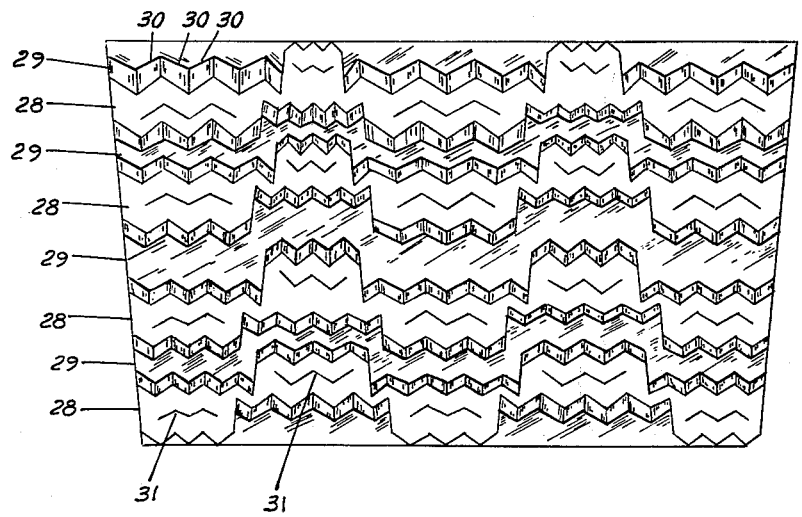
FIGURE 5 shows the footprint of a preferred embodiment of the slipped plane design utilizing the wide tapered void.

A number of variations can be incorporated into the design of the tread to increase the traction. Thus, the individual blocks may have circumferential zigzag sides. Reference to FIGURE 5 indicates an actual tread design constructed in accordance with the embodiment of the present invention. Circumferential rib elements 28 are formed and are separated by circumferential grooves 29. The sides of the ribs 28 are broken up with a continuous lightning or zigzag configuration 30. Generally, speaking, the zigzag of adjacent blocks tend to complement and fit within the zigzag of the adjacent rib.

Additional variations can be utilized by incorporating very thin sipes 31 or splits in the block element. Such sipes not only give a slight degree of increased traction, but tend to increase the degree of stability of the rib portion. Sipe elements are generally old in the art and are utilized in a great number of tread designs.

In actual tests under identical snow temperature and load conditions, comparisons were run to indicate the differences between the slipped plane design and a conventional passenger tire design. Also, a good conventional mud and snow tire was run to indicate the advantage of the slipped plane concept. A given draw-bar weight was connected to a towing vehicle equipped with the various types of tires to be tested. A calibrated strain gage was fixed to the rear axle. The amount of torque required to break traction or spin the wheels in the snow conditions was then determined. This in effect indicated the amount of traction which was given by each design. Table I below indicates the results obtained with the passenger design, mud and snow design and slipped plane design. The results indicate a decided advantage of the slipped plane over the conventional mud and snow design and a conventional passenger tire design.

*Table I*

| Tire design: | Tractive effort in pounds |
| --- | --- |
| Passenger | 67 |
| Mud and snow | 95 |
| Slipped plane | 111 |

Another factor which has added greatly to the traction of the slipped plane design is one that is referred to as a wide tapered void. Generally speaking, the voids of conventional tires are either formed by perpendicular walls extending radially outward from the tire or walls which have a very slight divergent angle as the wall is formed radially outward from the center of the tire. The voids, however, incorporated with the present invention are especially wide at the tread surface. The width of the void at the tread surface is limited only by the design practically relating to the elements. In order to have a sufficient amount of tread surface on the running surface or road, practical considerations indicate that at least 50% of the tread be solid road contacting surface. Contrarily, at least somewhat less than 50% of the periphery of the tread can be void area.

Maximum included angles of the void walls previously were limited to around 25° to 30° included angle and generally were much less. The current design utilized with this invention has a minimum of 30° included angle and has incorporated maximum included angles of 115°. The exact amount of included angle will be governed by the tread depth. If the void is too wide in relation to the tread depth, there will be insufficient tread element contacting the traction surface. On the other hand the wide tapered void utilized with this invention has a minimum limited only by what is referred to as the wedge angle. The wedge angle is that included angle which must be utilized in order to insure likelihood that foreign objects, such as stones, will be thrown off as the tire rotates under general conditions. As was stated previously, the maximum included angle commonly utilized has generally been limited to under 25° to 30°. The wide angle void utilized in this invention varies from 30° to 115° included angle.

The theoretical basis behind the wide angle void concept insures that on soft road surfaces the sides of the voids actually become load bearing surfaces. As the tire rotates upon the contacting surface relatively soft road material, such as mud, sand or snow, is actually compacted into the void. The soft material thus not only bears upon the side of the void, but upon the void surface itself. The compaction of the soft material will increase the shear strength of the material. One need only to envision two columns, one of which is formed by free-falling snow flakes and the other which is compacted such that a greater amount of material is forced into the given volume. It is obvious that one may easily draw an object through the column which has been formed by the free-falling flakes. On the other hand, the compacted column has gained such a degree of rigidity that the column will resist an object being drawn through the column. In other words, the shear strength of the packed column has been increased. The utilization of zigzag sides on the tapered void adds to gripping edges which may be utilized against the compacted material. Though the use of wide angle tapered void has been found to be particularly beneficial when combined with the slipped plane concept, tests have shown that the wide angle tapered void concept is also beneficial to conventional design traction tires.

Tires have been built in accordance with the combination slipped plane concept and wide angle tapered void concept. A preferred embodiment of the above invention indicates that a tire having four circumferential rib portions separated by three wide angle tapered void portions are very successful. Additionally, tires incorporating the above features worked very well with even three circumferential rib portions separated by two wide angle void portions. Though the combined concept will work equally well with a lagrer number than four circumferential rib portions, there appears to be no particular benefit in going to more than four rib portions. At any rate it has been determined that the combination slipped plane concept and wide tapered void concept is not limited to a given number of ribs or voids.

In the above designs it has been found that when four rib portions are utilized, it is desirable to have voids substantially symmetrically displaced across the tread portion. Thus, one of the voids is placed at about the midportion of the tread with a void on either side of the center void. Additionally, the maximum benefit of the wide angle tapered void can be obtained by having the center void containing the maximum practical included angle. Thus, the center void generally is designed with an included angle of 90° to 115°. However, in order to insure that sufficient road contacting surfaces will result, the two side voids have included angles generally less than the center void. It has been found that with normal tread depths the two side voids can have included angles of from 45° to 55° and still have substantially 50% of the tread surfaces as road contacting surfaces.

In a tire having only three circumferential ribs separated by two voids the voids can have relatively large included angles generally in the range of from 75° to 105°. Such an angle will allow for approximately 50% of the tread surface to be road contacting surfaces. At any rate it should be remembered that in designing tires utilizing the wide tapered void at least 50% of the tread surface should be road contacting surfaces. It has been found that with less than 50% road contacting surface, an abnormal loss of road stability results.

Figure 6:
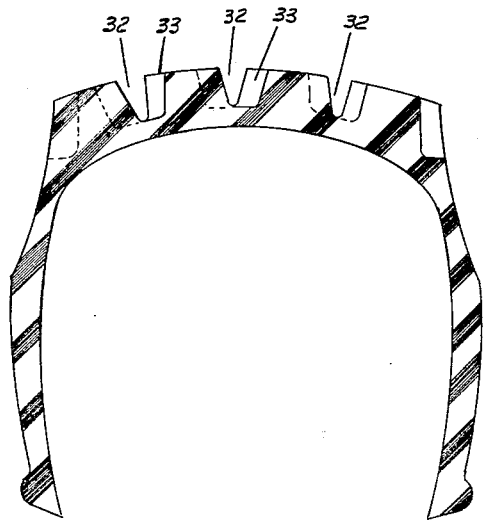
FIGURE 6 shows a cross section of a tire incorporating the slipped plane and wide tapered void concepts.

Tire slippage in soft road material, such as mud or snow, occurs when the formed mud or snow column is sheared by torque applied to the wheel. Conventional mud or snow tires form relatively tall columns which are rather loosely packed. In other words, there is no compacting force as applied by the wide tapered void. In addition, the columns of the conventional mud and snow tire have small contacting area at the road surface. Thus, there is a limited amount of resistance to any shearing action of the column as formed by the conventional mud and snow tire. The wide tapered void, on the other hand, has a relatively large road contacting area of the packed column. It will be remembered that the large taper provides for a large road contacting surface of the packed column. Thus, not only does the column itself become compacted and resist a breaking of the column, but the column has a greater road contacting surface and so increases the resistance to the shearing action. The wide tapered void as employed in this invention combined with the slipped plane concept forms a continuous circumferential column. In other words, as the tire with the embodiments of this invention rotates upon a road surface covered with snow, a continuous snow column will be formed. FIGURE 6 is a cross section of a tire formed in accordance with the embodiments of this invention. The grooves 32 can be seen to be continuous along the entire circumference of the tire even though there are indented portions 33 formed by the slipped plane concept.

Figure 4A:
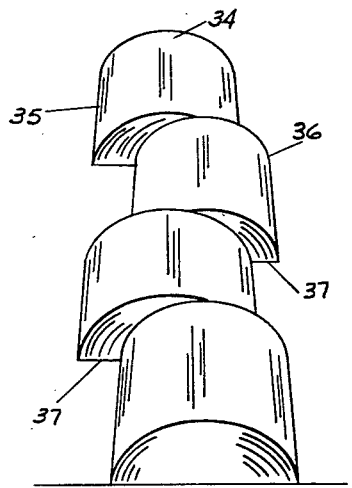
FIGURES 4A, 4B and 4C show snow columns formed by the slipped plane concept.
Figure 4B:
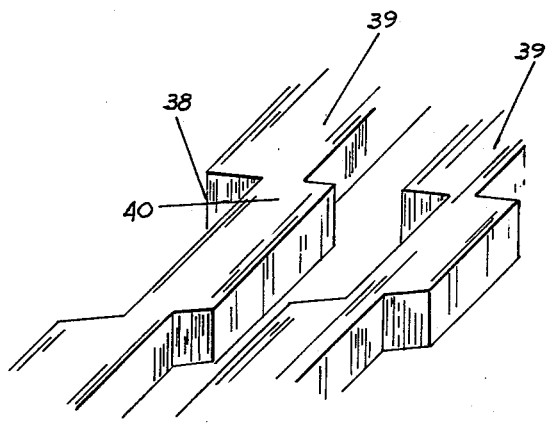
Figure 4C:
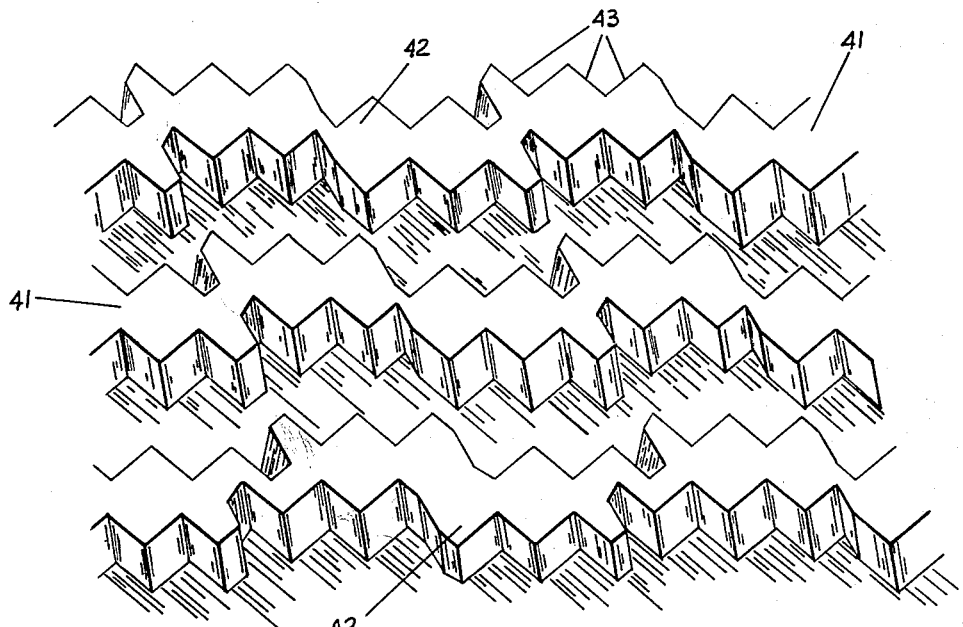

Reference to the series of FIGURES 4A, 4B and 4C further indicates the continuity of the circumferential column formed by the slipped plane concept. FIGURE 4A shows a hemispherical column 34 formed in accordance with the slipped plane concept. Adjacent elements 35 and 36 have been laterally shifted relative to one another in accordance with the slipped plane concept. However, a continuous column course exists around a given circumferential portion of the column. Shear faces 37 are formed by the traction elements. The indented portions form shear surfaces in the column of snow against which the traction elements may exert force.

FIGURE 4B shows an additional snow column which can be formed by the slipped plane concept. Here again, indented traction surfaces 38 are formed in the snow column 39. However, a continuous column exists in the area 40 to form a continuous road contacting surface. FIGURE 4C shows the snow column which is formed by one of the preferred embodiments of the present invention. The columns 41 are continuous along the circumference of the tire. In addition to the slipped portions 42 relative to adjacent transverse elements, indented or zigzag surfaces 43 are provided in order to given an added number of shearing surfaces. It must be stressed that the column as such is circumferentially continuous. At some given point there is a circumferentially straight column formed. The wide angle tapered void additionally packs a hard and continuous column with very wide areas at the road surface. Packed continuous column offers a high resistance to shear forces both in the column itself and at the contacting surface between the column and the road surface. The two factors, namely the off-set gripping elements of the slipped plane design and the high compacted wide area column of the wide angled tapered void, account for exceptional traction possessed by a pneumatic tire incorporating these features.

In order to determine the effect of the wide tapered groove as a supplemental feature to the slipped plane design, various draw bar loads were affixed to a vehicle equipped with tires of various designs. The test conditions were under icy snow conditions. Under identical testing conditions the test vehicle was run over a course at constant engine speed. Rear wheel counters accurately measured the number of revolutions each test tire made going over a 100 foot course. A toboggan attached to the test vehicle by a tow bar was connected to a low load cell and dial indicator. Various draw bar pulls were obtained by loading the toboggan with different weights. Table II shows how a good conventional mud and snow tire rapidly lost traction with a draw bar pull in excess of 350 pounds. In contrast the data for the slipped plane tire with wide tapered grooves remains essentially constant up to a draw bar pull of almost 700 pounds. In the vicinity of 700 pounds pull the curve suddenly breaks upward indicating a sudden loss of traction.

*Table II*

[100′ PACKED FROZEN SNOW COURSE]

| Variable | Draw-Bar Load, pounds | Ave. Tire Revolutions | Ave. Tire Travel Per Revolution inches | Percent Tire Slip |
| --- | --- | --- | --- | --- |
| 8.00-14 Gates Commando: Average Tire Travel per Revolution at 0 Draw-Bar Load, Dry Macadam: 75.00″ | 80 | 16.50 | 72.72 | 3.2 |
| | 135 | 18.25 | 65.70 | 12.4 |
| | 165 | 18.50 | 64.80 | 13.6 |
| | 190 | 19.00 | 63.12 | 15.8 |
| | 250 | 18.50 | 64.80 | 13.6 |
| | 250 | 19.00 | 63.12 | 15.8 |
| | 320 | 19.00 | 63.12 | 15.8 |
| | 340 | 19.00 | 63.12 | 15.8 |
| 8.00-14 XT-271: Average Tire Travel per Revolution at 0 Draw-Bar Load, Dry Macadam: 75.00″ | 115 | 17.00 | 70.56 | 5.9 |
| | 140 | 18.00 | 66.60 | 11.2 |
| | 180 | 18.50 | 64.80 | 13.6 |
| | 350 | 18.00 | 66.60 | 11.2 |
| | 400 | 18.00 | 66.60 | 11.2 |
| | 510 | 18.50 | 64.80 | 13.6 |
| | 610 | 18.50 | 64.80 | 13.6 |
| | 700 | 20.00 | 60.00 | 20.0 |

Static draw-bar loads were obtained by anchoring the vehicle and exerting a pull until either of the rear tires spun out. Again the slipped plane tapered void design showed its superiority by holding for 800 pounds before it spun out compared to only 675 pounds for a good conventional mud and snow tire.

Testing conducted on the slipped plane design concept indicated another interesting feature. Reference to FIGURE 1C indicates that conventional traction tires utilize individual blocks with inclination 44 of relatively shallow angles from a circumferential traction. The shallow angle reduces the tractive force of the blocks. The slipped plane design, on the other hand, can retain blocks having extremely high inclination from the direction of motion. As a matter of fact, current designs utilize an angle of only 4° inclination from the transverse direction of the tire. In other words, the transverse traction blocks are oriented at an angle of 86° from the circumferential direction of motion of the tire. The relatively low angle of inclination of the wedge or traction elements leads to an exceptionally quiet tire. In fact, the noise level of the traction tire compares most favorably with the noise level of conventional passenger tires. To further reduce the noise the consecutive wedge widths can be made up of different lengths and widths along the tread. This design can then be arranged in a random sequence such that the chance of any resonating frequencies occurring between consecutive wedges can be minimized.

The foregoing detailed description has been given for the purposes of illustration only and is not intended to limit the scope of the present invention which is to be determined from the appended claims.

What is claimed is:

1. In a tire having a rubber tread surface a plurality of generally circumferentially extending rib elements separated by circumferential grooves, said rib elements formed of traction elements with traction elements in adjacent ribs displaced in the same direction, and traction elements in the same rib displaced transversely in a direction opposite from adjacent traction elements.

2. In a tire having a rubber tread surface a plurality of continuous circumferentially extending rib portions separated by circumferential grooves having alternate shear surfaces displaced transversely in a direction opposite from adjacent shear surfaces in the same rib and transversely displaced in the direction as said shear surfaces in adjacent ribs.

3. In a tire having a rubber tread surface a plurality of continuous generally circumferential ribs separated by circumferential grooves having radially outward divergent walls having an included angle of from 30° to 115° said ribs having alternate tread surface portions transversely displaced in a direction opposite from adjacent surface portions in the same rib and transversely displaced in the direction as said tread surface portions in adjacent ribs.

4. In a tire having a rubber tread surface, a plurality of continuous generally circumferential ribs formed of wedge portions transversely displaced from an adjacent wedge portion and with adjacent wedges transversely convergent in opposite directions said ribs separated circumferentially by a circumferential groove having radially outward divergent walls having an included angle of from 30° to 115°.

5. In a tire having a rubber tread surface a series of four continuous circumferential ribs having ground contacting surface portions alternately transversely displaced from the adjacent circumferential surface portion, said ribs spaced apart by a first, second and third continuous circumferential groove, said first groove substantially disposed at the center portion of the tread surface and said groove having internal radially outward divergent wall portions defining an included angle of from 90° to 115° and said second and third grooves disposed on both sides of said first groove and defined by internal radially outward divergent wall portions having an included angle of from 45° to 55°.

6. In a tire having a rubber tread surface a series of three continuous circumferential ribs having ground contacting surface portions transversely displaced in a direction opposite from adjacent circumferential ground contacting surface portions in the same rib and transversely displaced in the same direction of said ground-contacting surface portions in adjacent ribs, said ribs spaced apart by continuous circumferential grooves disposed on both sides of a continuous circumferential rib disposed substantially at the center portion of the tread surface, said grooves defined by internal wall portions said internal wall portions defining a generally radially outward divergent included angle of from 75° to 105°.

7. In a tire having a rubber tread surface, a plurality of generally circumferentially extending rib elements separated by generally circumferentially extending grooves, said rib elements and said grooves defining wedge portions extending transversely across the entire said tread surface with alternate circumferential wedge portions transversely displaced from adjacent wedge portions in the same rib.

8. In a tire having a rubber tread surface, a plurality of continuous generally circumferential rib portions separated by circumferential grooves having radially outward convergent walls having an included angle of from 140° to 85° and having alternate shear surfaces transversely displaced in oposite directions from adjacent shear surfaces in the same rib and transversely displaced in the same direction as said shear surface in adjacent ribs and having radial zigzag faces substantially coincident with zigzag faces of opposing rib faces.

9. In a tire having a rubber tread surface a plurality of continuous circumferential ribs separated by circumferential grooves, said ribs having ground contacting surface portions transversely displaced in a direction opposite from adjacent ground contacting surface portions in the same rib and transversely displaced in the same direction as adjacent ground contacting surface portions in adjacent ribs, said circumferential grooves having radially outward divergent walls having an included angle of from 30° to 115° said tread surface comprising at least 50% of surface contacting portions.

References Cited by the Examiner
UNITED STATES PATENTS

| | | | |
|---|---|---|---|
| D. 182,340 | 3/58 | Palko | 152—209 |
| 2,403,309 | 7/46 | Smith | 152—209 X |
| 2,497,518 | 2/50 | Salcy | 152—209 |
| 2,575,439 | 11/51 | Billingsley | 152—209 |
| 2,704,102 | 3/55 | Starr et al. | 152—209 X |
| 2,756,798 | 7/56 | Palko et al. | 152—209 |
| 3,023,798 | 3/62 | Moore et al. | 152—209 |

ARTHUR L. LA POINT, *Primary Examiner.*